Aug. 3, 1926.

V. LINDHOLM

TIRE

Filed April 8, 1925

Victor Lindholm INVENTOR

BY Victor J. Evans

ATTORNEY

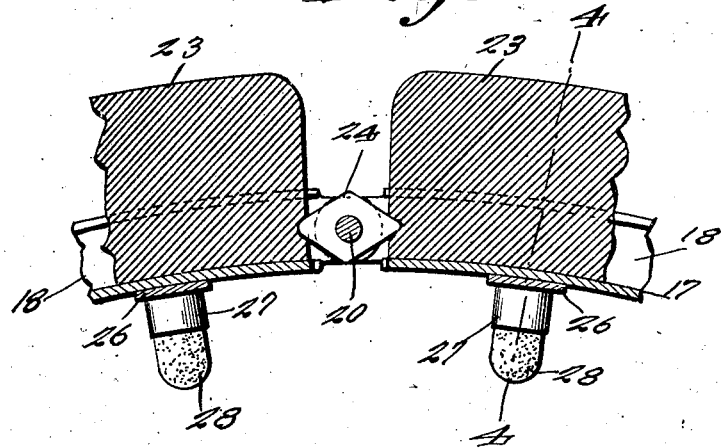
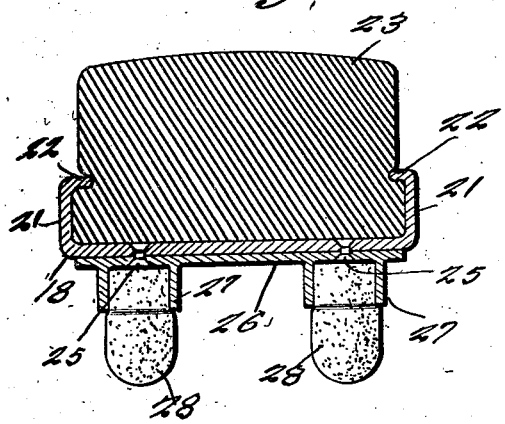
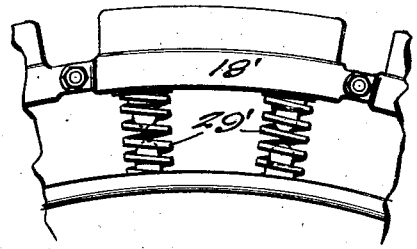
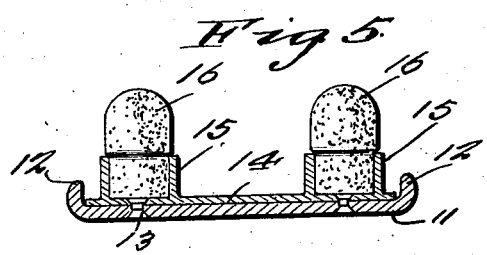

Patented Aug. 3, 1926.

1,595,010

UNITED STATES PATENT OFFICE.

VICTOR LINDHOLM, OF SAN FRANCISCO, CALIFORNIA.

TIRE.

Application filed April 8, 1925. Serial No. 21,645.

This invention relates to improvements in tires for vehicle wheels and has for an object the provision of a tire which is not subject to puncture, will absorb shocks and jars and insure riding comfort, and in addition will resist tendency to skid.

Another object of the invention is the provision of a tire which in addition to the above and other advantages, is strong and durable of construction and in which the worn or useless parts may be readily renewed.

With the above and other objects in view, the invention further includes the following novel features and details of construction, to be hereinafter more fully described, illustrated in the accompanying drawings and pointed out in the appended claims.

In the drawings:—

Figure 3 is an enlarged fragmentary section illustrating the connection between the adjacent ends of the ground engaging members.

Figure 4 is a section taken substantially on the line 4—4 of Figure 3.

Figure 5 is a transverse sectional view through the inner rim.

Figure 6 is a fragmentary elevation showing a portion of a tire of a slightly modified construction.

Figure 1:
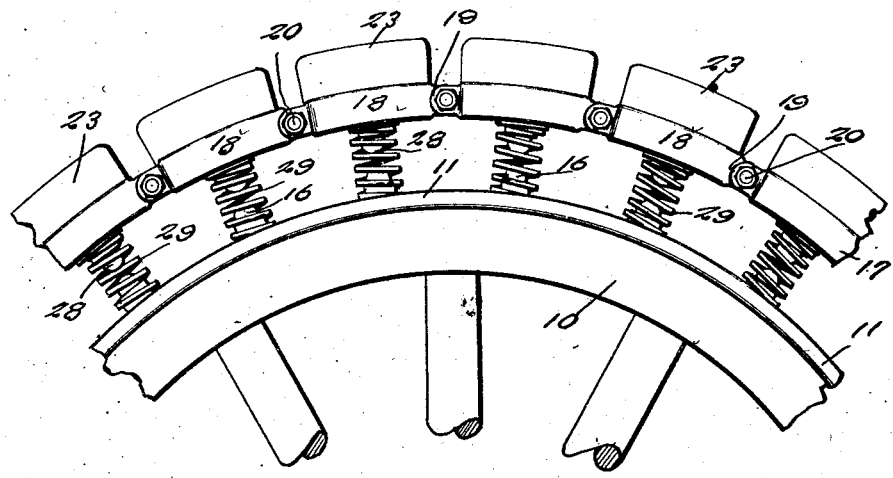
Figure 1 is an elevation showing a fragmentary portion of a vehicle wheel with a portion of the improved tire attached.
Figure 2:
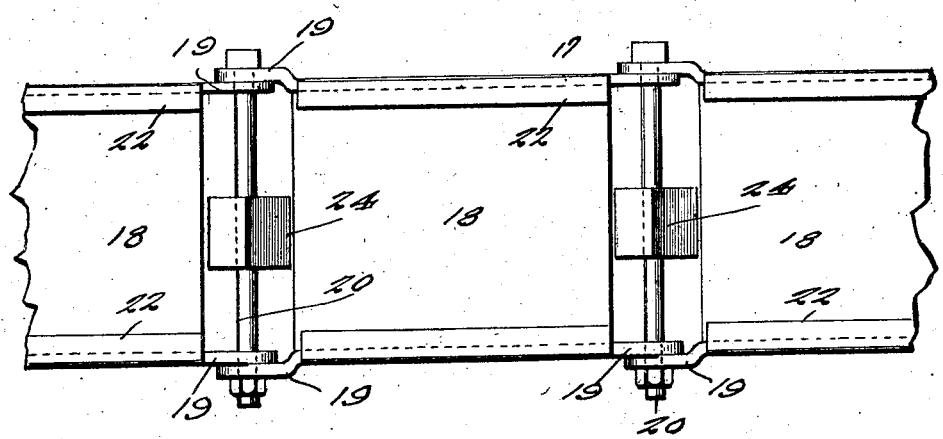
Figure 2 is an enlarged fragmentary plan view with the ground engaging members removed.

Referring to the drawings in detail wherein like characters of reference denote corresponding parts, the reference character 10 indicates a portion of the felly of a wheel to which is secured a metallic rim 11. This rim is preferably constructed as illustrated in Figure 5 of the drawings and may be provided upon its opposite side edges with a bead 12. An annular channel is thus provided within which is riveted or otherwise secured as indicated at 13, an annulus 14. Extending from this annulus are preferably cup-shaped members 15 which receive rubber or other studs 16, the cup-shaped members and studs being arranged in pairs and spaced circumferentially.

Extending around and spaced from the rim 11 is an outer rim 17. This rim is formed of separate sections 18 at the opposite ends of which are provided spaced ears 19, the latter having openings for the passage of pivot pins or bars 20, whereby the sections 18 are pivotally and detachably connected. The opposite side edges of the sections 18 are provided with flanges 21 having inturned beads 22, so that the sections 18 provide holders for rubber or other compressible ground engaging members 23. The members 23 are spaced apart as shown in the drawings and in order to prevent circumferential creeping movement of these members the pivot pins or bars 20 have mounted thereon substantially diamond-shaped spacing blocks 24 which engage notches provided in the opposite ends of the members 23.

Riveted or otherwise secured to each of the sections 18 as shown at 25 is a plate 26. The series of these plates like the annulus 14 is provided with spaced pairs of cup-shaped extensions 27 which receive rubber or other compressible studs 28. Springs 29 have their opposite ends engaged over the cup-shaped members 15 and 27 with the studs 16 and 28 extending within the springs. The outer sectional rim 17 is thus yieldingly spaced from the inner rim 11 while the form of connection between the sections 18 of the outer rim permits of independent pivotal movement of the sections.

In Figure 6, the construction is similar to that just described except that instead of each section 18' being supported by a single pair of springs 29, spaced pairs of springs 29' connect each section with the inner rim 11.

The invention is susceptible of various changes in its form, proportions and minor details of construction and the right is herein reserved to make such changes as properly fall within the scope of the appended claims.

Having described the invention what is claimed is:—

1. A tire comprising a wheel secured rim, a plurality of holders, pivot bars connecting the holders to provide an outer sectional rim spaced from the wheel secured rim, compressible ground engaging members carried by the holders of the outer rim, spacing members carried by the pivot bars and engaging the adjacent ends of the ground engaging members to prevent circumferential creeping movement of the latter and yieldable means interposed between the holders and the wheel secured rim.

2. A tire comprising an inner wheel secured rim, an outer rim spaced from the wheel secured rim, said outer rim comprising separate sections, each section including a substantially channel-shaped member, apertured ears at each end of the channel-shaped member, pivot pins connecting the ears of adjacent members, beads extending along the opposite side edges of the channel-shaped members, compressible ground engaging members positioned within the channel-shaped members, spacing blocks mounted upon the pivot pins and engaging the adjacent ends of the ground engaging members and yieldable means interposed between each section of the outer rim and the wheel secured rim.

In testimony whereof I affix my signature.

VICTOR LINDHOLM.